United States Patent
Young et al.

(10) Patent No.: US 11,222,514 B1
(45) Date of Patent: Jan. 11, 2022

(54) AUTOMATED TELLER MACHINE CARD EJECTION MECHANISM

(71) Applicant: Capital One Services, LLC, McLean, VA (US)

(72) Inventors: Stephen Young, Keswick, VA (US); Matthew Kolesaric, Mechanicsville, VA (US); Michael Kidd, Litchfield, NH (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/028,537

(22) Filed: Sep. 22, 2020

(51) Int. Cl.
*G07F 19/00* (2006.01)
*G06Q 20/20* (2012.01)
*G06Q 20/18* (2012.01)
*G06Q 20/10* (2012.01)

(52) U.S. Cl.
CPC ........ *G07F 19/204* (2013.01); *G06Q 20/1085* (2013.01); *G06Q 20/18* (2013.01); *G06Q 20/20* (2013.01); *G07F 19/21* (2013.01)

(58) Field of Classification Search
CPC ............................ G07F 19/21; G06Q 20/1085
See application file for complete search history.

(56) References Cited

U.S. PATENT DOCUMENTS

| 5,929,413 A | * | 7/1999 | Gardner | ................ G06Q 20/18 235/379 |
| 8,511,542 B2 | | 8/2013 | Pan | |
| 2013/0048713 A1 | * | 2/2013 | Pan | ................ G07F 19/207 235/379 |

FOREIGN PATENT DOCUMENTS

| JP | 2013050932 A | * 3/2013 |
| JP | 5635956 B2 | 12/2014 |

* cited by examiner

*Primary Examiner* — A. Hunter Wilder
(74) *Attorney, Agent, or Firm* — Harrity & Harrity, LLP

(57) ABSTRACT

In some implementations, an automated teller machine (ATM) may accept a card. The ATM may eject the card at a first time. The ATM may retract the card based on a determination that a threshold amount of time has elapsed from the first time and that the card has not been removed. The ATM may eject the card at a second time after retracting the card. The ATM may retract the card based on a determination that the threshold amount of time has elapsed from the second time and that the card has not been removed. The ATM may provide the card to a card storage compartment of the ATM after retracting the card and based on a determination that the card has been ejected or retracted a threshold number of times.

20 Claims, 7 Drawing Sheets

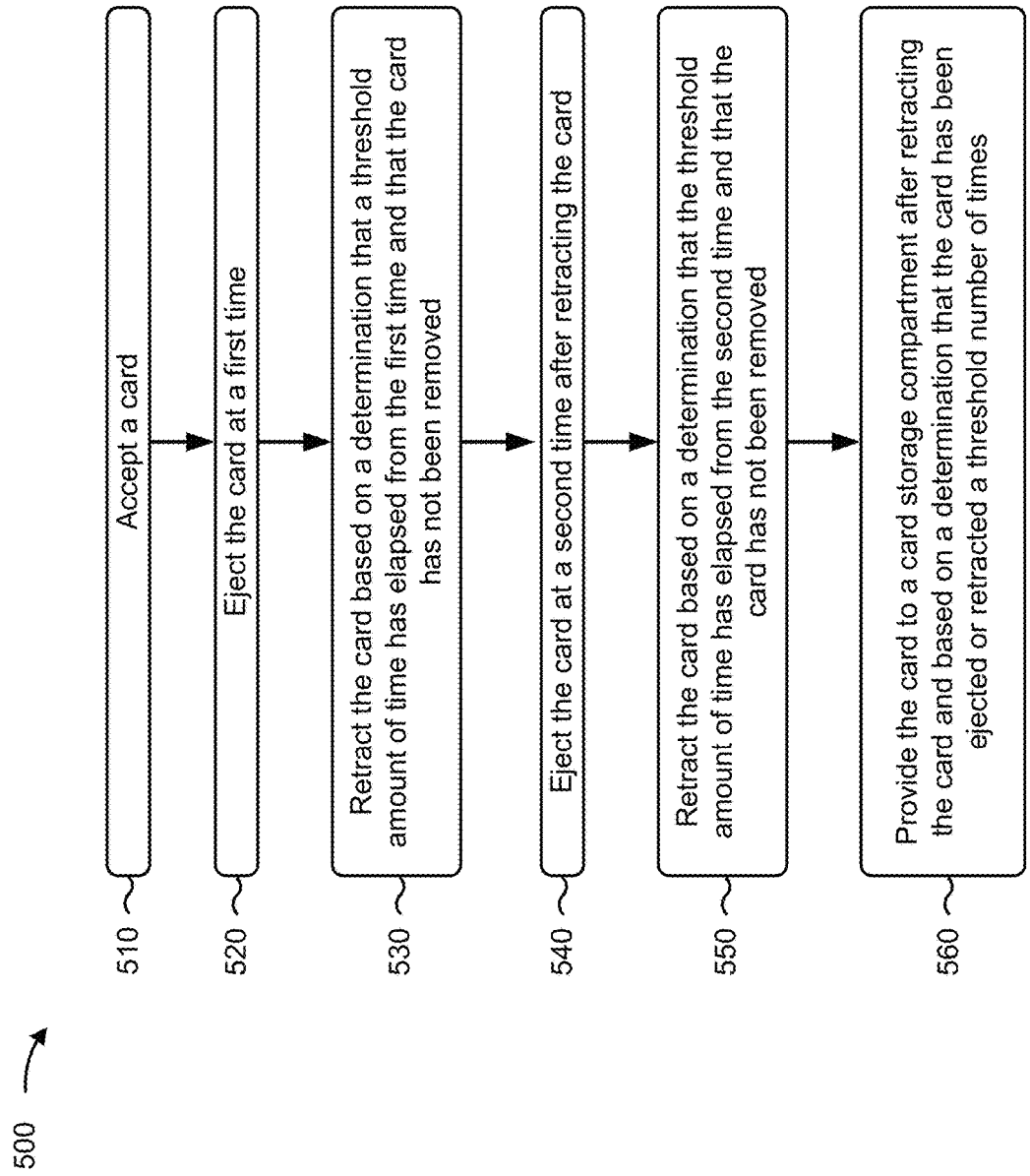

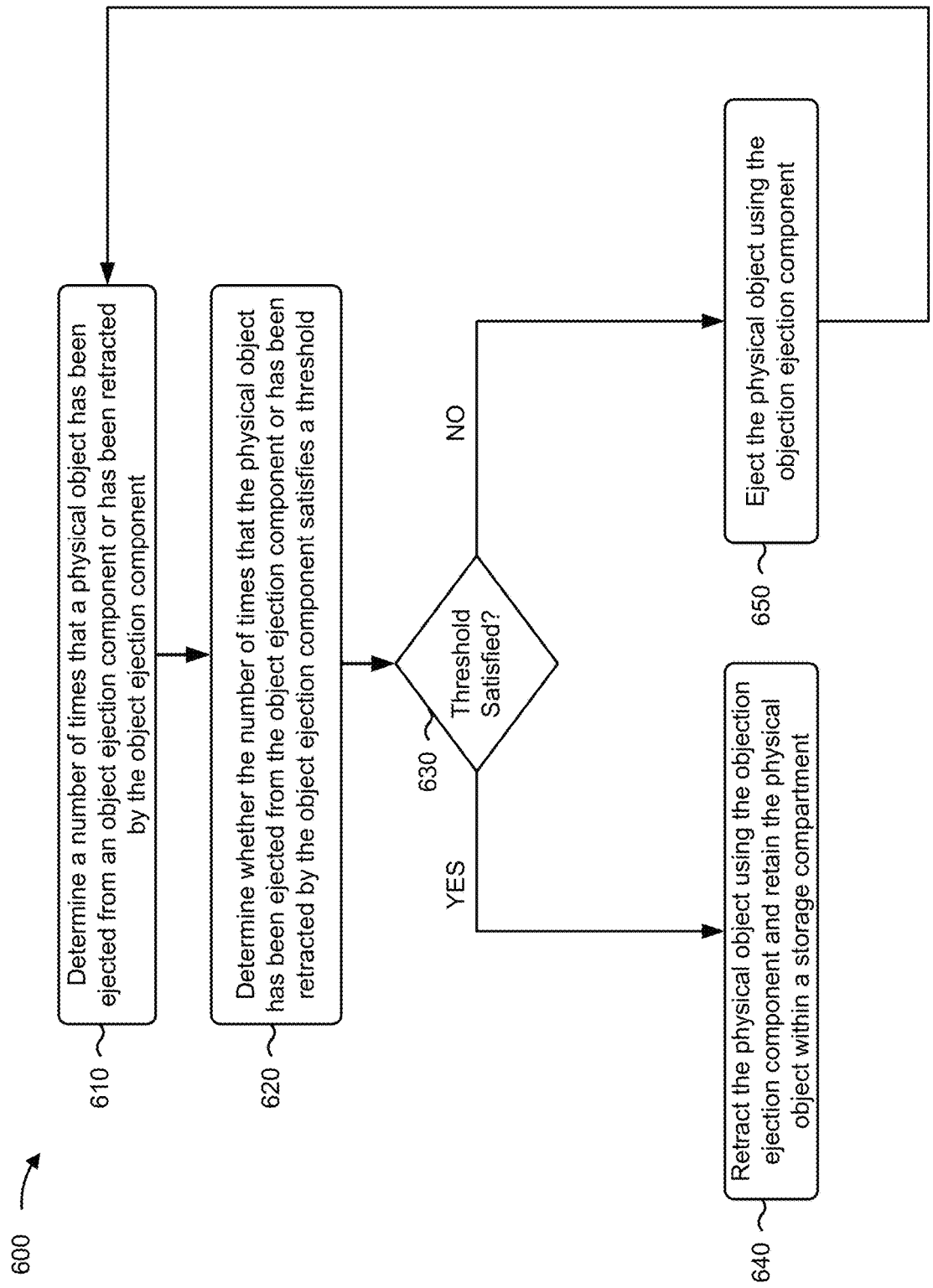

AUTOMATED TELLER MACHINE CARD EJECTION MECHANISM

BACKGROUND

An automated teller machine (ATM) is an electronic communication device that enables users to perform financial transactions, such as cash withdrawals, deposits, funds transfers, or account information inquiries at any time without interacting directly with a human teller. An ATM may be referred to using other names, such as an automated banking machine (ABM), a cashpoint, or a cash machine. Some ATMs include a card reader with an actuator to retract a card within a housing of the ATM.

SUMMARY

In some implementations, a method includes accepting, by a motorized card reader of an automated teller machine (ATM), a card. The method may include ejecting, by the motorized card reader of the ATM, the card at a first time. The method may include retracting, by the motorized card reader of the ATM, the card based on a determination that a threshold amount of time has elapsed from the first time and that the card has not been removed from the motorized card reader. The method may include ejecting, by the motorized card reader of the ATM, the card at a second time after retracting the card. The method may include retracting, by the motorized card reader of the ATM, the card based on a determination that the threshold amount of time has elapsed from the second time and that the card has not been removed from the motorized card reader. The method may include providing, by the motorized card reader of the ATM, the card to a card storage compartment of the ATM after retracting the card and based on a determination that the card has been ejected or retracted a threshold number of times.

In some implementations, an ATM includes a housing, a motorized card reader configured to retract a card into the housing and eject the card from the housing, a card storage compartment housed within the housing, a memory, and one or more processors communicatively coupled to the memory. The one or more processors may be configured to determine that a card has been inserted into the motorized card reader. The one or more processors may be configured to instruct the motorized card reader to eject the card at a first time after the card has been inserted into the motorized card reader. The one or more processors may be configured to determine that the card has not been removed from the motorized card reader and that a first amount of time, that has elapsed from the first time at which the card was ejected, satisfies a first threshold. The one or more processors may be configured to instruct the motorized card reader to retract the card based on determining that the card has not been removed from the motorized card reader and that the first amount of time satisfies the first threshold. The one or more processors may be configured to instruct the motorized card reader to eject the card at a second time after the card has been retracted. The one or more processors may be configured to determine that the card has not been removed from the motorized card reader and that a second amount of time, that has elapsed from the second time at which the card was ejected, satisfies a second threshold. The one or more processors may be configured to instruct the motorized card reader to retract the card based on determining that the card has not been removed from the motorized card reader and that the second amount of time satisfies the second threshold. The one or more processors may be configured to determine that the card has been ejected or retracted by the motorized card reader a threshold number of times. The one or more processors may be configured to instruct the motorized card reader to provide the card to the card storage compartment based on determining that the card has been ejected or retracted by the motorized card reader the threshold number of times.

In some implementations, a non-transitory computer-readable medium stores one or more instructions that, when executed by one or more processors of a device that includes a housing, a storage compartment for storing physical objects within the housing, and an object ejection component for retracting and ejecting one or more physical objects from the device, cause the device to determine a number of times that a physical object has been ejected from the object ejection component or has been retracted by the object ejection component. The one or more instructions may cause the device to determine whether the number of times that the physical object has been ejected from the object ejection component or has been retracted by the object ejection component satisfies a threshold. The one or more instructions may cause the device to retain or eject the physical object using the object ejection component based on determining whether the number of times that the physical object has been ejected from the object ejection component or has been retracted by the object ejection component satisfies the threshold. The one or more instructions may cause the device to retract the physical object using the objection ejection component and to retain the physical object within the storage compartment based on a determination that the number of times that the physical object has been ejected from the object ejection component or has been retracted by the object ejection component satisfies the threshold. The one or more instructions may cause the device to eject the physical object using the objection ejection component based on a determination that the number of times that the physical object has been ejected from the object ejection component or has been retracted by the object ejection component does not satisfy the threshold.

BRIEF DESCRIPTION OF THE DRAWINGS

FIGS. 5 and 6 are flowcharts of example processes relating to ATM card ejection.

DETAILED DESCRIPTION

The following detailed description of example implementations refers to the accompanying drawings. The same reference numbers in different drawings may identify the same or similar elements.

An automated teller machine (ATM) may include a card reader with an actuator to retract a card within a housing of the ATM, such as a motorized card reader. To perform a financial transaction, a user may insert a card into the card reader, and the card reader may retract the card within the ATM to read the card and obtain account information to enable the financial transaction to be performed. The card reader may later eject the card, such as after the card is read and/or after the financial transaction is performed, so that the user can retrieve the card from the card reader.

Sometimes, a user may forget to retrieve the card from the card reader. To protect the user's card and account information, the card reader may retract and retain the card within the ATM after some time has passed from when the card was ejected. The card reader may provide or deposit the card in a card storage compartment housed within the ATM. The card storage compartment occupies a limited physical space, and thus can only contain a limited number of cards. If the card storage compartment becomes filled with cards and reaches its storage capacity, the ATM may be programmed to go out of service (e.g., shut down, stop accepting cards, and/or disable further financial transactions) until the card storage compartment is emptied. Furthermore, a full card storage compartment can result in ATM errors (e.g., mechanical errors, electrical errors, or the like), mechanical failures (e.g., associated with the card reader and/or an actuator of the card reader), and wear and tear.

Some implementations described herein are capable of reducing the number of cards that are retained within a card storage compartment of an ATM. More generally, some implementations described herein are capable of reducing a number of physical objects that are housed within a device configured to eject and retract such physical objects and store such physical objects within a storage compartment of the device. As a result, the ATM (or device) will go out of service less frequently, experience fewer errors and mechanical failures, and have less wear and tear, resulting in a longer service life. Furthermore, by reducing the likelihood that a card is retained within a card storage compartment of an ATM, some implementations described herein conserve computing resources (e.g., processing resources and/or memory resources) and/or network resources that would otherwise be used to cancel an account associated with the card, create a new account for the card holder, issue a new card, transfer information from an old account to a new account, and/or other computation and/or communication tasks that would otherwise be performed if the card were retained by the storage compartment and/or destroyed.

Figure 1A:
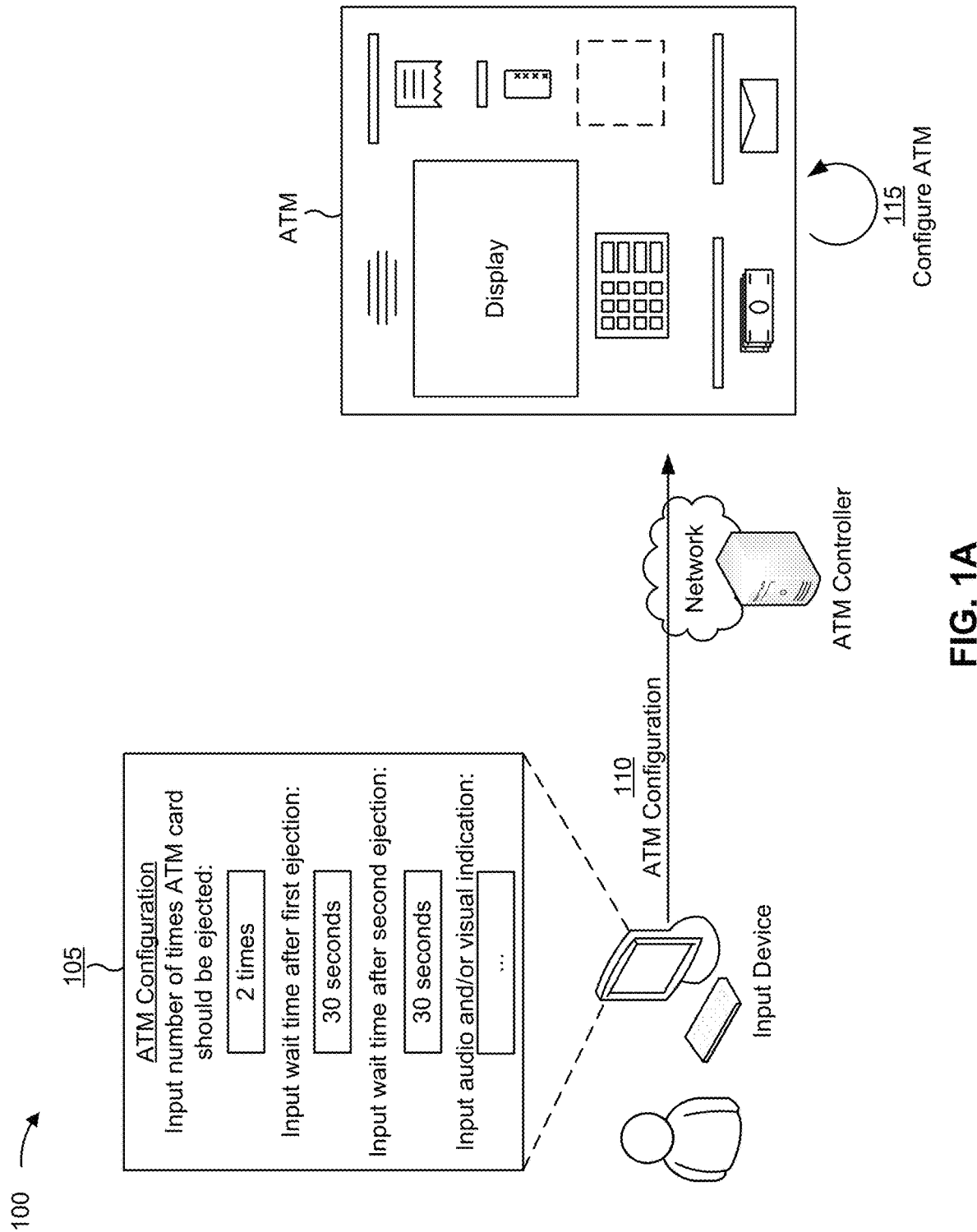
FIGS. 1A and 1B are diagrams of an example implementation relating to an automated teller machine (ATM) card ejection mechanism.
Figure 1B:
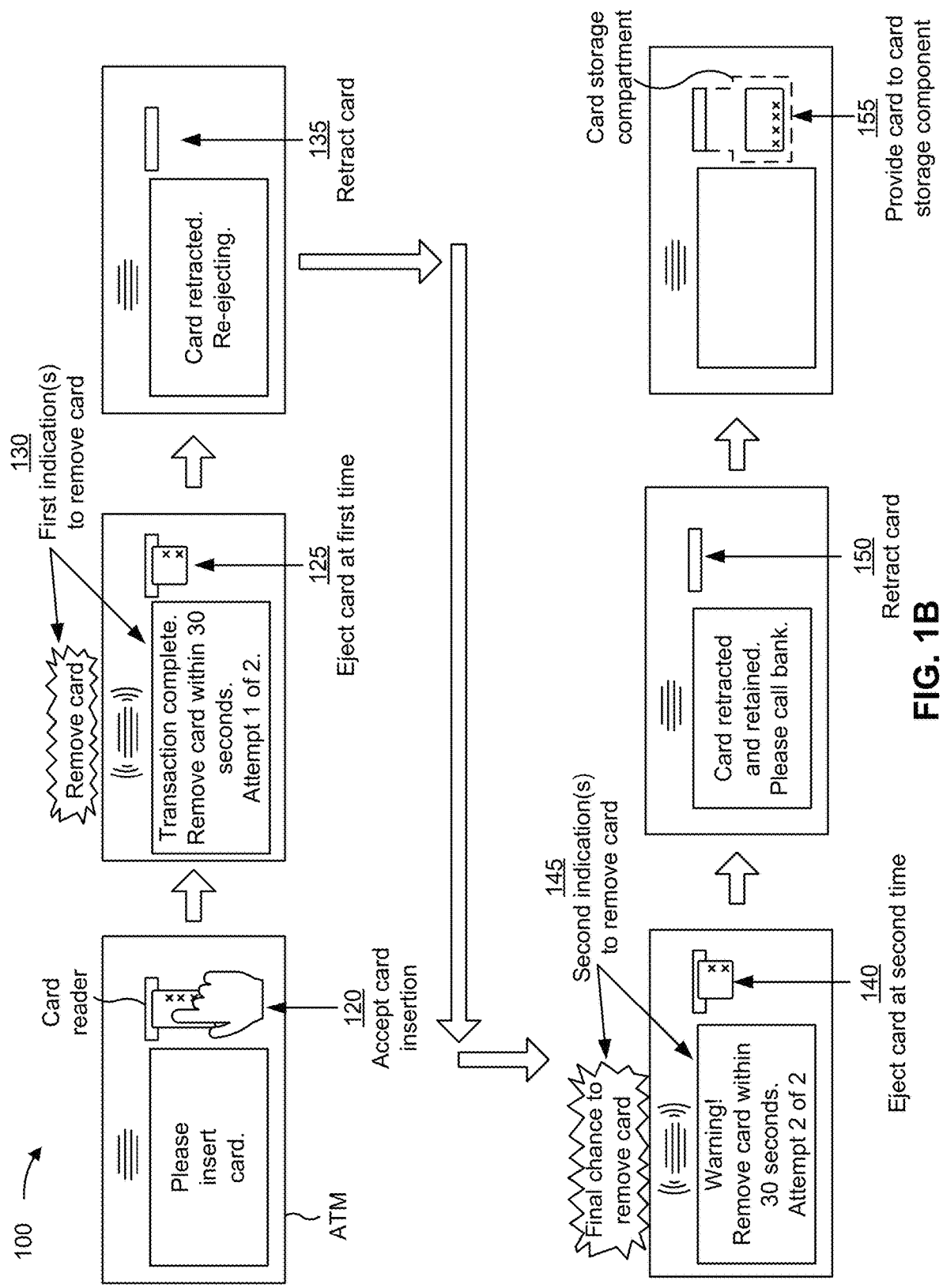

FIGS. 1A and 1B are diagrams of an example 100 relating to an ATM card ejection mechanism. As shown in FIGS. 1A and 1B, example 100 includes an ATM, an input device for receiving an ATM configuration for the ATM, and an ATM controller for remotely configuring the ATM. These devices are described in more detail in connection with FIGS. 3 and 4.

As shown by reference number 105, the input device (e.g., a computer) may receive input from a user to specify an ATM configuration. The ATM configuration may include one or more parameters that control a manner in which an ATM ejects a card, retracts a card, and/or retains a card. For example, as shown in FIG. 1A, the ATM configuration may include a parameter that indicates a number of times that a card is to be ejected from (or retracted by) an ATM (shown as "2 times"), a parameter that indicates a wait time from ejection of a card to retraction of the card (shown as "30 seconds"), and/or a parameter that indicates an audio and/or visual indication output by the ATM in association with ejecting a card, retracting a card, and/or retaining a card.

In some implementations, the ATM configuration may include a parameter to configure an ATM to eject a card multiple times (e.g., two times, three times, four times, etc.) so as to reduce a number of cards that are retained within a card storage compartment of the ATM. In this case, the ATM configuration may include different parameters for different card ejections. For example, the ATM configuration may include a parameter that indicates a first wait time from a first ejection of a card to retraction of the card, a parameter that indicates a second wait time from a second ejection of a card to retraction of the card, and so on. In FIG. 1A, the first wait time after the first ejection and the second wait time after the second ejection are shown as having the same value of "30 seconds." In some implementations, the first wait time and the second wait time (and more generally, different wait times corresponding to different card ejections) may be configured with different values. In some implementations, the first wait time may be shorter than the second wait time (e.g., a first threshold that indicates the first wait time may be smaller than a second threshold that indicates the second wait time) to increase the likelihood of capturing the attention of a user while the user is located within a vicinity of the ATM (e.g., before the user leaves the vicinity of the ATM), resulting in the user retrieving their card from the card reader and reducing a number of cards retained by the ATM.

Additionally, or alternatively, the ATM configuration may include different audio indications and/or different visual indications for different card ejections. For example, the ATM configuration may indicate a louder volume for an audio message that is output for a later-occurring card ejection as compared to an earlier-occurring card ejection to capture a user's attention before retracting and retaining the card within the ATM. Additionally, or alternatively, for different card ejections, the ATM configuration may indicate a different audio message (e.g., output by a speaker of the ATM), a different visual message (e.g., presented on a display of the ATM), a different set of lights that illuminate, a different pattern for illumination of lights, and/or a different speed of card ejection, among other examples. Some example indications (e.g., audio messages, visual messages, lights, etc.) are described below in connection with FIG. 1B, and any of these indications may be specified in the ATM configuration.

As shown by reference number 110, the input device may transmit the ATM configuration, input by the user, to an ATM controller. The ATM controller may communicate with one or more ATMs to configure and/or control the one or more ATMs. After receiving the ATM configuration from the input device, the ATM controller may transmit the ATM configuration to the one or more ATMs, shown as a single ATM in FIG. 1A. In some implementations, the ATM controller may transmit the ATM configuration to multiple ATMs, which may be indicated in the ATM configuration and/or may be input by the user to the input device. For example, the ATM configuration may indicate that ATMs within a particular geographic region and/or associated with a particular financial institution are to be configured with the ATM configuration.

As shown by reference number 115, upon receiving the ATM configuration, the ATM may configure itself according to the ATM configuration. This configuration may include storing, deleting, and/or overwriting code stored in memory of the ATM, such that when a processor executes the code (e.g., one or more instructions), the ATM operates according to the ATM configuration. For example, the ATM may store an indication of the number of times that the card is to be ejected and may use this number as a threshold during operation to determine whether a card is to be ejected or retracted and retained within a card storage compartment of the ATM. Additionally, or alternatively, the ATM may store an indication of a wait time associated with each card ejection and may use the wait time(s) as a threshold during operation to determine when to retract an ejected card (e.g., when the wait time has elapsed after card ejection).

FIG. 1B shows an example of an ATM operating according to an ATM configuration that indicates multiple card ejections to reduce a number of cards that are retained within a card storage compartment of the ATM. In this example, the ATM operates according to the ATM configuration described above in connection with FIG. 1A. However, other ATM configurations may differ from what is described herein.

As shown by reference number 120, a card reader of an ATM may accept a card. For example, a user may manually insert a card (e.g., partially or entirely) into the card reader. The card reader may recognize that a card has been inserted, and may accept the card by using an actuator to retract the card into the card reader (e.g., within a housing of the ATM). The card reader may read the card (e.g., to determine an account identifier, such as a card number or an account number), and may provide information read from the card to one or more other components of the ATM (e.g., a processor, a memory, a communication component) to enable the ATM to operate based on that information. For example, the ATM may transmit an account identifier to an account management device, which may identify and transmit account information to the ATM based on the account identifier. The ATM may provide output (e.g., via a display) to enable a user to perform one or more financial transactions using the account information.

As shown by reference number 125, at a first time during operation of the ATM in connection with the accepted card, the card reader may eject the card. For example, the card reader may eject the card based on input received from the user, based on determining that a user has finished performing financial transactions, and/or based on a threshold amount of time elapsing since accepting the card, among other examples. As used herein, "ejecting" a card (or physical object) means partially ejecting the card (or physical object) such that the card reader (or another object ejection component) can subsequently retract the card (or physical object). When a card is ejected, a first portion of the card is within a housing of the ATM such that an actuator of the card reader can act upon the card, and a second portion of the card is external from the housing such that a user can grasp and remove the card entirely from the housing. During ejection of the card, an actuator of the card reader acts on (e.g., pushes) the card to transition the card from a retracted state (e.g., in which the card is fully housed within the ATM and cannot be grasped or retrieved by the user) to an ejected state (e.g., in which the card is partially housed within the ATM, as described above).

As shown by reference number 130, in connection with the card being ejected at the first time, the ATM may output one or more first indications to alert the user to retrieve (e.g., remove) the card. For example, the ATM may output an audio indication via a speaker, such as an audio recording that announces "Remove card." Additionally, or alternatively, the ATM may output a visual indication via a display, such as text that states "Transaction complete. Remove card within 30 seconds. Attempt 1 of 2." In some implementations, an indication that alerts a user to retrieve a card may indicate a wait time to notify the user of an amount of time that the card will remain ejected before being retracted (e.g., "Remove card within 30 seconds"). Additionally, or alternatively, an indication that alerts a user to retrieve a card may indicate an amount of time remaining before the card will be retracted by the card reader (e.g., a countdown timer). Additionally, or alternatively, an indication that alerts a user to retrieve a card may indicate a number of times that the card has been ejected (e.g., the "1" in "Attempt 1 of 2") and/or a number of times that the card will be ejected (e.g., the "2" in "Attempt 1 of 2") to notify the user that the card will be retained after the card has been ejected the threshold number of times.

As shown by reference number 135, the card reader may retract the card after the card is ejected the first time. For example, the card reader may retract the card based on a determination (e.g., by a processor of the ATM) that the card has not been removed from the card reader and that a threshold amount of time (e.g., a first threshold amount of time, a first wait time) has elapsed from the first time at which the card was ejected. Additionally, or alternatively, the card reader may retract that card based on a determination that person (e.g., a user associated with the card) is not within a proximity of the ATM, as described in more detail below. As used herein, "retracting" a card (or physical object) means acting on an ejected card (or physical object) to pull the card (or physical object) within a housing of the ATM (or another device). When a card is retracted, the card may be fully housed within the ATM such that a user cannot grasp, retrieve, or remove the card. During retraction of the card, an actuator of the card reader acts on (e.g., pulls) the card to transition the card from an ejected state to a retracted state, as described above.

In some implementations, the ATM may output an indication that the card has been retracted (e.g., "Card retracted"). Additionally, or alternatively, the ATM may output an indication to alert a user that the card will be re-ejected and/or that the user will have another opportunity to retrieve the card (e.g., "Re-ejecting"). As a result, a user may be alerted not to leave a proximity of the ATM and to retrieve the card when the card is subsequently ejected, thereby reducing the likelihood that the card is retained within a card storage compartment of the ATM and reducing a number of cards housed within the card storage compartment.

As shown by reference number 140, at a second time during operation of the ATM (e.g., after the first time at which the card is ejected and after a corresponding retraction), the card reader may eject the card. For example, the card reader may eject the card at the second time based on a determination (e.g., by a processor of the ATM) that the card has not been ejected (or retracted) a threshold number of times (e.g., as indicated in the ATM configuration). In some implementations, the card reader may eject the card immediately after retracting the card in an attempt to capture the user's attention. Alternatively, the card reader may eject the card after waiting a threshold amount of time from retracting the card. In some implementations, this threshold amount of time is configurable using the ATM configuration.

In some implementations, the card reader may eject the card at the second time based on a determination that a person (e.g., a user) is within a proximity of the ATM. For example, one or more components of the ATM may determine whether a person is within a proximity of the ATM, such as by using a motion sensor, an infrared sensor, a camera, a video camera, one or more computer vision or image processing techniques, one or more facial detection techniques, a device-to-device communication component (e.g., a personal area network communication component capable of detecting energy levels of nearby communication devices, such as a mobile device of the user), and/or another proximity sensor.

In some implementations, the ATM (or another device in communication with the ATM) may receive one or more first images of a vicinity of the ATM (which may include a person) captured when a person approaches an ATM, inserts a card into the ATM, and/or when the card is ejected from the ATM. After the card is ejected, the ATM (or the other device) may receive one or more second images of the vicinity of the ATM, and may retract the card based on a determination that the person is not within the vicinity of the ATM. The ATM (or the other device) may continue to receive images (e.g., for a threshold amount of time), and if a different person is detected within a vicinity of the ATM, then the ATM may provide the card to the card storage compartment. However, if the same person (e.g., the person that inserted the card) is detected in an image, the ATM may eject the card to allow that person to retrieve their card and reduce a number of cards stored within the card storage compartment.

By detecting whether a person is located within a proximity of the ATM, the ATM may improve security and reduce fraud by preventing the card from being ejected if the user has left the proximity of the ATM. In some implementations, the proximity sensing described above may be specific to the user, such as by using facial recognition to compare an image captured or received by the ATM with an image stored in connection with an account of the user (e.g., in an account management device), and only ejecting the card if a facial recognition technique indicates that the person located in proximity of the ATM is the same as the person in the stored image. In this way, the ATM may further improve security by preventing the card from being ejected when nobody is present at the ATM and/or when a person other than the account holder is present at the ATM.

As shown by reference number 145, in connection with the card being ejected at the second time, the ATM may output one or more second indications to alert the user to retrieve the card. For example, the ATM may output an audio indication via a speaker, such as an audio recording that announces "Final chance to remove card." Additionally, or alternatively, the ATM may output a visual indication via a display, such as text that states "Warning! Remove card within 30 seconds. Attempt 2 of 2." As shown, in some implementations, a first indication output in connection with the first ejection of the card may be different from a second indication output in connection with the second ejection of the card. FIG. 1B shows different audio messages and different visual messages for different card ejections. In some implementations, the ATM may output an audio message using a louder volume for a later-occurring card ejection as compared to an earlier-occurring card ejection to capture a user's attention before retracting and retaining the card within the ATM. Additionally, or alternatively, the ATM may illuminate a different set of lights for different card ejections (e.g., more lights for a later-occurring card ejection as compared to an earlier-occurring card ejection and/or different color lights for different card ejections), may illuminate lights in a different pattern for different card ejections (e.g., faster flashing for a later-occurring card ejection as compared to an earlier-occurring card ejection), and/or may eject a card with different speeds for different card ejections (e.g., faster ejection for a later-occurring card ejection as compared to an earlier-occurring card ejection), among other examples.

As shown by reference number 150, the card reader may retract the card after the card is ejected the second time. For example, the card reader may retract the card based on a determination (e.g., by a processor of the ATM) that the card has not been removed from the card reader and that a threshold amount of time (e.g., a second threshold amount of time, a second wait time) has elapsed from the second time at which the card was ejected, in a similar manner as described above in connection with reference number 135. Although the threshold amount of time is described above as being measured from a time at which a card is ejected, the threshold amount of time may be measured from another time associated with card ejection, such as a time at which an indication to remove the card is output. Furthermore, the time at which the card is ejected may be a time at which an actuator of the card reader begins to act on (e.g., push or eject) the card or a time at which an actuator of the card reader finishes acting on the card, among other examples.

As shown by reference number 155, the card reader may provide the card to a card storage compartment after retracting the card. For example, the card reader may provide the card to the card storage compartment based on a determination (e.g., by a processor of the ATM) that the card has been ejected (or retracted) a threshold number of times (e.g., according to an ATM configuration). The card reader may provide the card to the card storage compartment by, for example, acting upon (e.g., pulling) the card to draw the card further within a housing of the ATM as compared to a retracted state of the card such that the card is then deposited within or dropped into the card storage compartment. Additionally, or alternatively, the card reader may release the card to drop the card into the card storage compartment, or may otherwise act upon the card such that the card becomes physically located within the card storage compartment. When the card is physically located within the card storage compartment, the user cannot access the card without assistance from an operator that can open the housing of the ATM to retrieve the card from the card storage compartment.

In some implementations, the operations described above in connection with FIG. 1B may be performed by a processor of the ATM. For example, the processor may determine whether various conditions are satisfied, and may transmit one or more instructions to the card reader based on such determinations. In some implementations, the processor may determine that a condition is satisfied (e.g., that a card has not been removed from the card reader, that a threshold amount of time has elapsed from ejecting the card, and/or that the card has been ejected or retracted a threshold number of times), and may instruct the card reader to perform an action based on determining that the condition is satisfied (e.g., to eject the card, to retract the card, and/or to provide the card to a card storage compartment). As another example, the processor may determine whether a number of times that a card has been ejected or retracted by the card reader satisfies a threshold, and may cause the ATM to either eject the card or retain the card within a card storage compartment based on whether the number of times satisfies the threshold, as described in more detail above. Additionally, or alternatively, the processor may instruct one or more output components of the ATM (e.g., a speaker, a display, etc.) based on determining that the condition is satisfied. The conditions and/or instructions may be based on the ATM configuration, as described above.

Although techniques are described above in connection with an ATM having a card reader configured to retract and eject a card and a card storage compartment configured to physically store one or more cards, these techniques can be applied to any device having an object ejection component configured to retract and eject a physical object and a storage compartment configured to physically store physical objects. For example, the techniques described herein can be applied to a fare card reader that requires card insertion, a point-of-sale terminal that requires card insertion, a kiosk, an access device, a device that provides access to a safety deposit box, a safe, and/or a vending machine, among other examples. As an alternative to a card (e.g., an ATM card, a transaction card, a bank card, a credit card, a debit card, an insurance card, a government identification card, and/or another type of card that can be read by a card reader), the physical object can be currency (e.g., cash, a banknote), a check, a receipt, a passbook, jewelry, government-issued identification (e.g., a passport), and/or another physical object that can be inserted into the device via an object ejection component capable of ejecting and retracting the physical object and providing the physical object to the storage compartment.

Using the techniques described herein, the frequency with which a card or another physical object is retracted and retained within a storage compartment of a device can be reduced. As a result, the device may remain in service more often (e.g., when filling up the storage compartment causes the device to go out of service), may experience fewer errors (e.g., when filling up the storage compartment causes the device to experience an error), may experience fewer mechanical failures (e.g., when filling up the storage compartment results in or could lead to a mechanical failure, such as a breakage of the storage compartment and/or damage to the card reader or another component), may require less maintenance (e.g., to empty the storage compartment, put the device back in service, correct errors, and/or fix mechanical failures), may have less wear and tear, and may have a longer service life.

As indicated above, FIGS. 1A-1B are provided as an example. Other examples may differ from what is described with regard to FIGS. 1A-1B. For example, FIGS. 1A-1B provide an example where a card is ejected two times. In some implementations, the card may be ejected more than two times, such as three times, four times, and so on.

Figure 2:
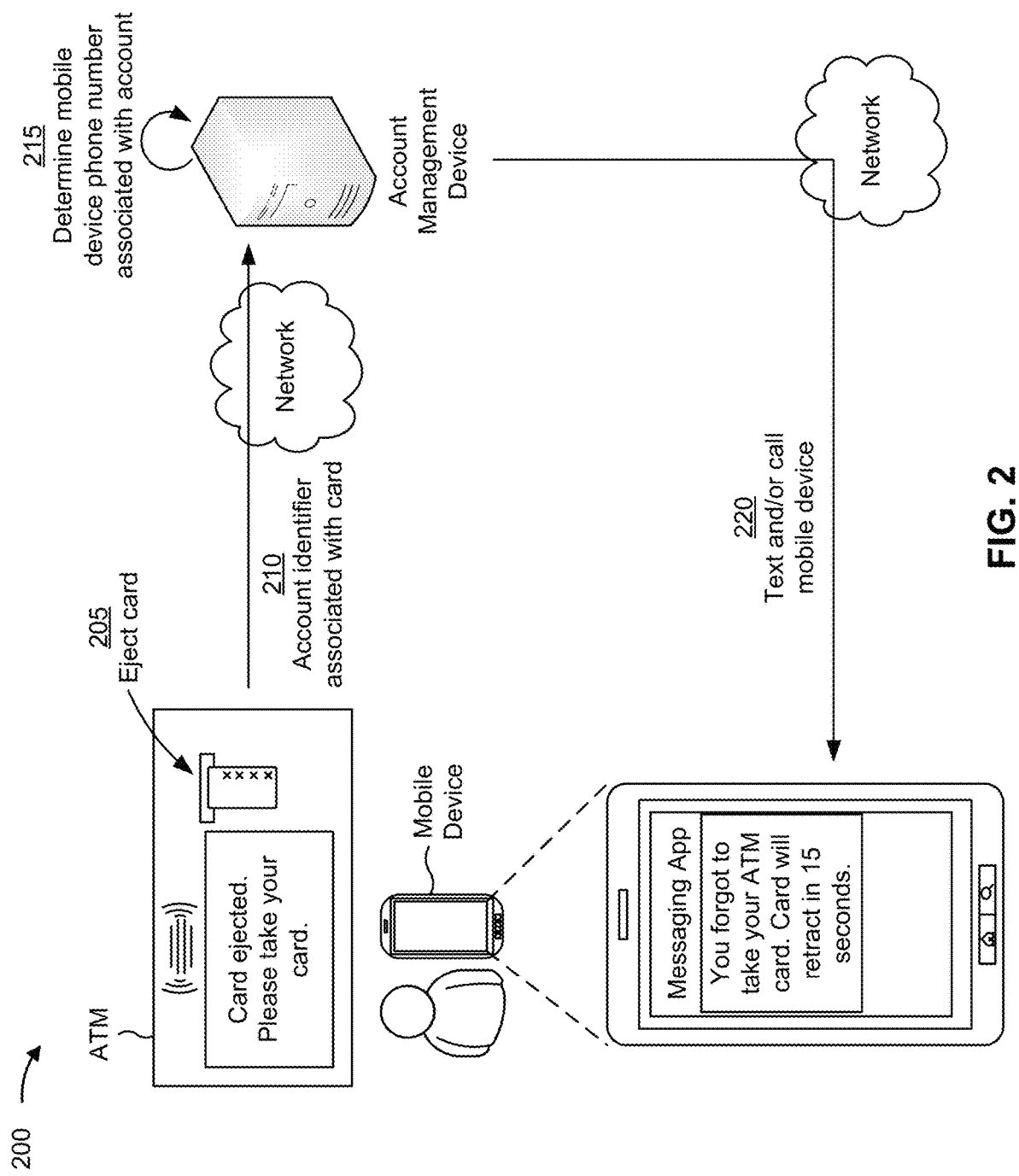
FIG. 2 is a diagram of another example implementation relating to an ATM card ejection mechanism.

FIG. 2 is a diagram of an example 200 relating to an ATM card ejection mechanism. As shown in FIG. 2, example 200 includes an ATM, an account management device that communicates with the ATM, and a mobile device capable of receiving a message from the account management device. These devices are described in more detail in connection with FIGS. 3 and 4. In some implementations, the operations described in connection with FIG. 2 may be performed in connection with the operations described above in connection with FIG. 1B (e.g., based on ejecting a card at a first time and/or at a second time). Alternatively, the operations described in connection with FIG. 2 may be performed independently of the operations described above in connection with FIG. 2 (e.g., in connection with ejecting a card in a scenario where the ATM does not eject the card multiple times).

As shown by reference number 205, a card reader of the ATM may eject a card, as described above in connection with reference number 125 of FIG. 1B and/or reference number 140 of FIG. 1B. As shown by reference number 210, the ATM may transmit an account identifier associated with the card (e.g., based on the card reader reading the card, as described above in connection with FIG. 1B) to an account management device in association with an instruction to contact a mobile device associated with the account identifier (e.g., to alert a use to remove their card). The account identifier and the instruction may be transmitted in the same message or a different message.

In some implementations, the ATM may transmit the account identifier based on a determination that a person (e.g., a user) is not within a proximity of the ATM, is exiting a proximity of the ATM, and/or has turned their face and/or body away from the ATM, among other examples. One or more components of the ATM may make this determination using, for example, a motion sensor, an infrared sensor, a camera, a video camera, one or more computer vision or image processing techniques, one or more facial detection techniques, a device-to-device communication component, and/or another type of proximity sensor.

As shown by reference number 215, the account management device may determine a phone number associated with the account, such as by performing a lookup in a data structure using the account identifier to identify a phone number associated with the account identifier. The account management device may store, in the data structure, account information associated with the account identifier, such as an account balance, a credential (e.g., a personal identification number) and/or information associated with recent transactions. In example 200, the account management device may store contact information associated with a user of the account (e.g., an account holder), such as a phone number (e.g., a mobile phone number).

As shown by reference number 220, the account management device may use the phone number to cause a communication, such as a phone call or a text message (e.g., a short message service (SMS) message, a multimedia messaging service (MMS) message, etc.), to be transmitted to a mobile device associated with the phone number. The account management device may transmit the message to the mobile device via a network (e.g., a core network and/or a radio access network) and/or may request or instruct another device (e.g., a messaging server) to transmit the message to the mobile device. As shown, the message transmitted to the mobile device may alert a user of the mobile device to remove a card from the ATM. For example, the message may include one or more indications (e.g., audio and/or visual indications) described above in connection with FIG. 1B. In example 200, the message states "You forgot to take your ATM card. Card will retract in 15 seconds." In some implementations, content of the message is configurable using the ATM configuration described elsewhere herein.

In some implementations, the operations described in connection with FIG. 2 may be performed for each card ejection of multiple card ejections (e.g., a first ejection at a first time and a second ejection at a second time, as described above in connection with FIG. 1). As a result, the number of cards retained and stored by a card storage compartment of the ATM can be reduced as compared to performing these operations for fewer than all card ejections.

Alternatively, the operations described in connection with FIG. 2 may be performed for a single card ejection or a subset of card ejections of multiple card ejections (e.g., only the first ejection at the first time or only the second ejection at the second time, as described above in connection with FIG. 1). For example, the operations described in connection with FIG. 2 may be performed upon a final card ejection (e.g., based on a processor determining that a number of ejections satisfies a threshold), and may not be performed for any other card ejections (e.g., based on a processor determining that a number of ejections does not satisfy a threshold). In this way, network resources and computing resources used to determine and transmit the information described in connection with FIG. 2 can be conserved as compared to performing these operations in connection with every card ejection or a greater number of card ejections.

As indicated above, FIG. 2 is provided as an example. Other examples may differ from what is described with regard to FIG. 2.

Figure 3:
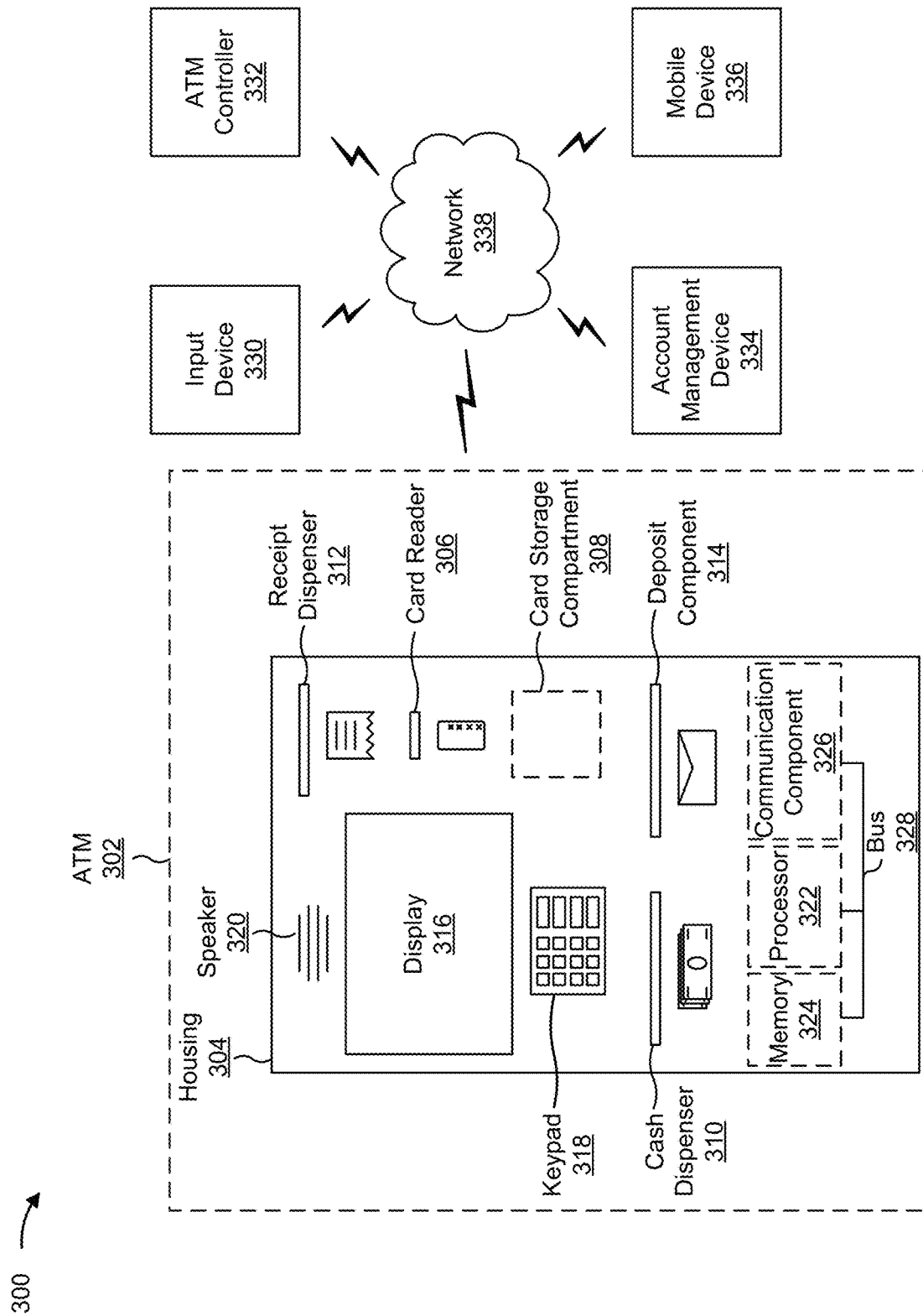
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an ATM 302, which may include a housing 304, a card reader 306, a card storage compartment 308, a cash dispenser 310, a receipt dispenser 312, a deposit component 314, a display 316, a keypad 318, a speaker 320, a processor 322, a memory 324, a communication component 326, and/or a bus 328. As further shown in FIG. 3, environment 300 may include an input device 330, an ATM controller 332, an account management device 334, a mobile device 336, and/or a network 338. Devices of environment 300 may interconnect via wired connections, wireless connections, or a combination of wired and wireless connections.

The ATM 302 includes one or more devices capable of performing one or more financial transactions, such as a cash withdrawal, a money deposit (e.g., a check or cash deposit), a money transfer (e.g., a transfer from one bank account to another bank account), and/or providing access to account information (e.g., a bank account, a checking account, a credit card account, etc.). The ATM 302 may be an ATM or a similar device, such as an automated banking machine (ABM), a cash point, a Cashline®, a Minibank®, a cash machine, a Tyme® machine, a cash dispenser, a Bankomat®, a Bancomat®, and/or a similar type of device. In some implementations, the ATM 302 may include one or more sensors to detect whether a person is within a proximity of the ATM, is exiting a proximity of the ATM, and/or has turned their face and/or body away from the ATM, as described elsewhere herein.

The ATM 302 includes a housing 304 that houses one or more components and/or portions of one or more components of the ATM 302, such as one or more components of the ATM 302 described in connection with FIG. 3. The housing may be constructed to prevent unauthorized access to internal components of the ATM 302, such as the card storage compartment 308 and/or other storage compartments that physically store cards, currency (e.g., cash, banknotes), and/or deposits (e.g., checks)

The card reader 306 includes one or more components for reading account information from a card. For example, the card reader 306 may include a motorized card reader or another type of card reader with one or more actuators capable of ejecting or retracting a card. The card reader may include a reading component to read account information from the card (e.g., an account identifier, an expiration date), such as a magnetic stripe reader, a chip reader, and/or a near-field communication reader. The card may be, for example, a transaction card, an ATM card, a bank card, a credit card, and/or a debit card.

The card storage compartment 308 is housed within the housing 304 and physically stores cards that have been retracted within and retained by the ATM 302. For example, if a card ejected by the card reader 306 is not removed from the card reader 306 for a threshold amount of time, the card may be retracted by the card reader 306 and provided to the card storage compartment 308 for physical storage. In some implementations, the card storage compartment 308 is inaccessible without opening the housing 304 or a portion of the housing 304 that contains and provides access to the card storage compartment 308.

The cash dispenser 310 includes one or more components for dispensing cash as part of a financial transaction performed using the ATM 302. The cash dispenser 310 includes one or more actuators capable of obtaining cash from a cash storage compartment housed within the housing 304 and dispensing the obtained cash for removal by a user (e.g., from the cash dispenser 310 and/or a cash tray to which the cash is dispensed). In some implementations, the cash dispenser 310 is capable of ejecting cash, retracting cash (e.g., if the cash is not removed after a threshold amount of time), and/or providing retracted cash to a cash storage compartment (which may be the same as or different from the cash storage compartment from which the cash is obtained).

The receipt dispenser 312 includes one or more components capable of printing and dispensing a receipt (e.g., by applying ink to paper) associated with a financial transaction performed using the ATM 302. In some implementations, the receipt dispenser 312 may be capable of ejecting a receipt, retracting a receipt (e.g., if the receipt is not removed after a threshold amount of time), and/or providing a retracted receipt to a receipt storage compartment.

The deposit component 314 includes one or more components capable of accepting a deposit insert to the deposit component 314 by a user. In some implementations, the deposit component 314 includes a check reader (e.g., a motorized check reader) capable of reading a check and providing deposit information (e.g., a check amount, an account identifier that identifies an account from which the check amount is to be transferred) for performing a financial transaction (e.g., a deposit or funds transfer). In some implementations, the deposit component 314 includes one or more actuators capable of retracting a check (or other deposit note), ejecting a check (e.g., if the check is not valid), and/or providing a retracted check to a check storage compartment.

The display 316 includes any type of display capable of outputting information for display. For example, the display 316 may include a monitor, a screen, a touch screen, a light-emitting diode (LED) display, and/or a cathode-ray tube (CRT) display, among other examples.

The keypad 318 includes one or more input components that permit a user to provide input to the ATM 302 (e.g., to the processor 322 of the ATM 302). For example, the keypad 318 may be and/or may include a number pad, a personal identification number (PIN) pad, a keyboard, a set of buttons (e.g., mechanical buttons that use mechanical actuation or electronic buttons that use electronic actuation), and/or another type of input component. In some implementations, the keypad 318 may be integrated with the display 316, such as for a touch screen.

The speaker 320 includes any type of component capable of outputting audio and/or producing sound. For example, the speaker 320 may be and/or may include a loudspeaker, a dynamic speaker, and/or an audio amplifier, among other examples.

The processor 322, the memory 324, and the communication component 326 are described in more detail below in connection with processor 420, memory 430, and communication component 460, respectively, of FIG. 4. The bus 328 provides communicative connectivity among the processor 322, the memory 324, and the communication component 326, similar to bus 410 described below in connection with FIG. 4.

The input device 330 includes one or more devices capable of receiving an ATM configuration input by a user and/or received from another device and transmitting the ATM configuration to the ATM 302 (e.g., via the ATM controller 332, in some implementations), as described elsewhere herein. For example, the input device 330 may include a computing device and/or a communication device, such as a computer, a server, a mobile phone, and/or a similar type of device.

The ATM controller 332 includes one or more devices capable of receiving an ATM configuration from the input device 330 and transmitting the ATM configuration to one or more ATMs 302, as described elsewhere herein. For example, the ATM controller 332 may include a computing device and/or a communication device, such as a computer, a server, and/or a similar type of device.

The account management device 334 includes one or more devices capable of storing account information and communicating with one or more other devices in connection with the account information, as described elsewhere herein. For example, the account management device 334 may include a computing device and/or a communication device, such as a computer, a server, and/or a similar type of device. The account management device 334 may store information in memory using one or more data structures and/or databases.

The mobile device 336 includes one or more devices capable of wireless communication, as described elsewhere herein. For example, the mobile device 336 may include a mobile phone, a user equipment, a laptop computer, a tablet computer, a wearable device (e.g., a smart wristwatch, a pair of smart eyeglasses, and/or smart clothing), and/or a similar type of device.

The network 338 includes one or more wired and/or wireless networks. For example, the network 338 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 338 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
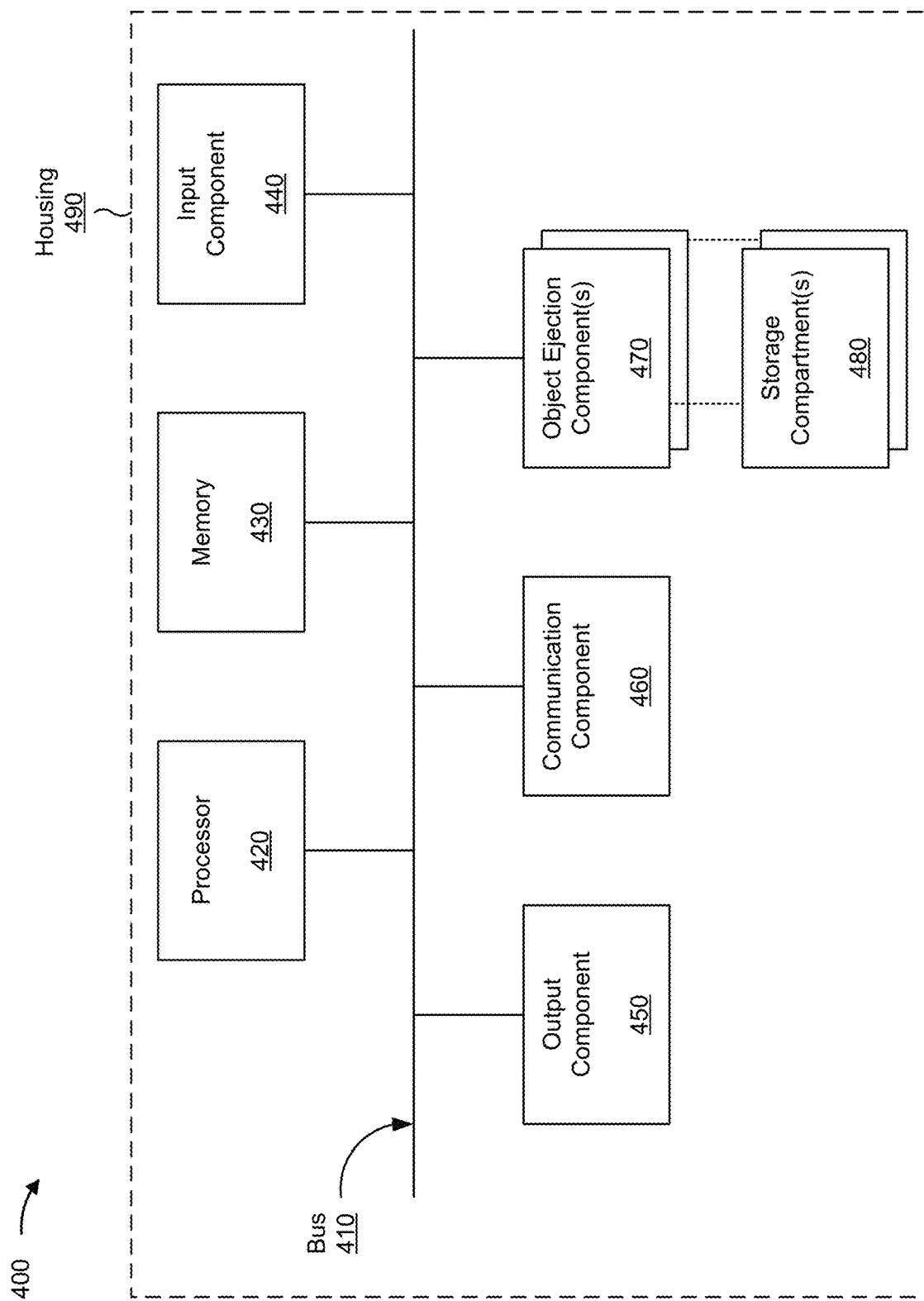
FIG. 4 is a diagram of example components of a device capable of ejecting and retracting physical objects, such as an ATM.

FIG. 4 is a diagram of example components of a device 400. In some implementations, the device 400 is an ATM, such as the ATM 302 of FIG. 3. Alternatively, the device 400 may be another type of device, such as a fare card reader, a point-of-sale terminal, a kiosk, an access device, a vending machine, a device that provides access to a safety deposit box or a safe, and/or another device with a card reader, among other examples. As shown in FIG. 4, the device 400 may include a bus 410, a processor 420, a memory 430, an input component 440, an output component 450, a communication component 460, an object ejection component 470, and/or a storage compartment 480. The device 400 may include a housing 490 that houses one or more of these components and/or portions of one or more of these components.

The bus 410 includes a component that enables wired and/or wireless communication among the components of the device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes volatile and/or non-volatile memory. For example, the memory 430 may include a random access memory (RAM), a read only memory (ROM), an electrically erasable programmable ROM (EEPROM), a hard disk drive, and/or another type of memory (e.g., a flash memory, a magnetic memory, and/or an optical memory). The memory 430 may include internal memory (e.g., RAM, ROM, a hard disk drive). The memory 430 may be a non-transitory computer-readable medium. The memory 430 stores information, instructions, and/or software (e.g., one or more software applications) related to the operation of the device 400.

The input component 440 enables the device 400 to receive input, such as user input and/or sensed inputs. For example, the input component 440 may include a touch screen (e.g., display 316), a keyboard, a keypad (e.g., keypad 318), a mouse, a button, a microphone, a switch, a sensor, a global positioning system component, an accelerometer, a gyroscope, an actuator, and/or the like. The output component 450 enables the device 400 to provide output, such as via a display (e.g., display 316), a speaker (e.g., speaker 320), and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The object ejection component 470 enables the device 400 to eject, retract, and/or retain a physical object (e.g., a card), as described elsewhere herein. For example, the objection ejection component 470 may include the card reader 306. The storage compartment 480 enables the device 400 to store one or more physical objects (e.g., one or more cards) within the housing 490. In some implementations, the device 400 may include multiple object ejection components 470 (e.g., a card reader 306, a cash dispenser 310, a receipt dispenser 312, and/or a deposit component 314). In some implementations, the device 400 is configured to permit each objection ejection component 470 to provide a physical object to a corresponding storage compartment 480. Alternatively, the multiple object ejection components 470 may provide respective physical objects to the same storage compartment 480. In some implementations, the object ejection component 470 is capable of retrieving a physical object from the storage compartment 480 and ejecting the physical object.

The device 400 may perform one or more processes described herein. For example, a non-transitory computer-readable medium (e.g., memory 430) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with ATM card ejection. In some implementations, one or more process blocks of FIG. 5 may be performed by an ATM (e.g., ATM 302). In some implementations, one or more process blocks of FIG. 5 may be performed by another device or a group of devices separate from or including the ATM, such as the device 400 of FIG. 4. Additionally, or alternatively, one or more process blocks of FIG. 5 may be performed by one or more components of the ATM 302 and/or the device 400, such as the card reader 306, the cash dispenser 310, the receipt dispenser 312, the deposit component 314, the processor 322, the communication component 326, the processor 420, the communication component 460, and/or the object ejection component 470.

As shown in FIG. 5, process 500 may include accepting a card (block 510). As further shown in FIG. 5, process 500 may include ejecting the card at a first time (block 520). As further shown in FIG. 5, process 500 may include retracting the card based on a determination that a threshold amount of time has elapsed from the first time and that the card has not been removed (block 530). As further shown in FIG. 5, process 500 may include ejecting the card at a second time after retracting the card (block 540). As further shown in FIG. 5, process 500 may include retracting the card based on a determination that the threshold amount of time has elapsed from the second time and that the card has not been removed (block 550). As further shown in FIG. 5, process 500 may include providing the card to a card storage compartment after retracting the card and based on a determination that the card has been ejected or retracted a threshold number of times (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. Furthermore, process 500 may include one or more blocks of one or more processes described elsewhere herein, such as process 600 of FIG. 6.

FIG. 6 is a flowchart of an example process 600 associated with ejection of a physical object. In some implementations, one or more process blocks of FIG. 6 may be performed by an ATM (e.g., ATM 302). In some implementations, one or more process blocks of FIG. 6 may be performed by another device or a group of devices separate from or including the ATM, such as the device 400 of FIG. 4. Additionally, or alternatively, one or more process blocks of FIG. 6 may be performed by one or more components of the ATM 302 and/or the device 400, such as the card reader 306, the cash dispenser 310, the receipt dispenser 312, the deposit component 314, the processor 322, the communication component 326, the processor 420, the communication component 460, and/or the object ejection component 470.

As shown in FIG. 6, process 600 may include determining a number of times that a physical object has been ejected from an object ejection component or has been retracted by the object ejection component (block 610). As further shown in FIG. 6, process 600 may include determining whether the number of times that the physical object has been ejected from the object ejection component or has been retracted by the object ejection component satisfies a threshold (block 620).

As further shown in FIG. 6, if the number of times that the physical object has been ejected from the object ejection component or has been retracted by the object ejection component satisfies a threshold (block 630—YES), then process 600 may include retracting the physical object using the objection ejection component and retaining the physical object within a storage compartment (block 640). As further shown in FIG. 6, if the number of times that the physical object has been ejected from the object ejection component or has been retracted by the object ejection component does not satisfy the threshold (block 630—NO), then process 600 may include ejecting the physical object using the object ejection component (block 650). As further shown, after the physical object is ejected, process 600 may return to block 610.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. Furthermore, process 600 may include one or more blocks of one or more processes described elsewhere herein, such as process 500 of FIG. 5.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   accepting, by a motorized card reader of an automated teller machine (ATM), a card;
   receiving information that identifies a threshold number of times that the card is to be ejected or retracted;
   configuring by the motorized card reader of the ATM, the ATM to eject or retract the card the threshold number of times based on the received information that identifies the threshold number of times that the card is to be ejected or retracted;
   ejecting, by the motorized card reader of the ATM, the card at a first time;
   retracting, by the motorized card reader of the ATM, the card based on a determination that a first threshold amount of time has elapsed from the first time and that the card has not been removed from the motorized card reader;
   ejecting, by the motorized card reader of the ATM, the card at a second time after retracting the card based on a determination that the card has not been ejected or retracted the threshold number of times;
   retracting, by the motorized card reader of the ATM, the card based on a determination that a second threshold amount of time has elapsed from the second time and that the card has not been removed from the motorized card reader; and
   providing, by the motorized card reader of the ATM, the card to a card storage compartment of the ATM after retracting the card and based on a determination that the card has been ejected or retracted the threshold number of times.

2. The method of claim 1, further comprising:
   receiving information that identifies the first threshold amount of time to wait before retracting the card; and
   configuring the ATM to retract the card after the first threshold amount of time has elapsed from ejection of the card based on receiving the information that identifies the first threshold amount of time to wait before retracting the card.

3. The method of claim 1, further comprising outputting, via a display or a speaker of the ATM, an indication of a number of times that the card will be ejected or retracted or a number of times that the card has been ejected or retracted.

4. The method of claim 1, further comprising outputting, via a display or a speaker of the ATM, an indication of an amount of time remaining before the card is to be retracted by the motorized card reader.

5. The method of claim 1, wherein ejecting the card at the second time comprises ejecting the card at the second time based on a determination that a person is present within a proximity of the ATM.

6. The method of claim 1, further comprising:
   determining an account identifier associated with the card; and
   transmitting an instruction to contact a mobile device associated with the account identifier based on ejecting the card at the first time or ejecting the card at the second time.

7. An automated teller machine (ATM), comprising:
   a housing;
   a motorized card reader configured to retract a card into the housing and eject the card from the housing;
   a card storage compartment housed within the housing;
   a memory; and
   one or more processors, communicatively coupled to the memory, configured to:
     determine that a card has been inserted into the motorized card reader;
     receive information that identifies a threshold number of times that the card is to be ejected or retracted;
     configure the ATM to eject or retract the card the threshold number of times based on the received information that identifies the threshold number of times that the card is to be ejected or retracted;
     instruct the motorized card reader to eject the card at a first time after the card has been inserted into the motorized card reader;
     determine that the card has not been removed from the motorized card reader and that a first amount of time, that has elapsed from the first time at which the card was ejected, satisfies a first threshold amount of time;
     instruct the motorized card reader to retract the card based on determining that the card has not been removed from the motorized card reader and that the first amount of time satisfies the first threshold amount of time;
     instruct the motorized card reader to eject the card at a second time after the card has been retracted based on a determination that the card has not been ejected or retracted the threshold number of times;
     determine that the card has not been removed from the motorized card reader and that a second amount of time, that has elapsed from the second time at which the card was ejected, satisfies a second threshold amount of time;
     instruct the motorized card reader to retract the card based on determining that the card has not been removed from the motorized card reader and that the second amount of time satisfies the second threshold amount of time;
     determine that the card has been ejected or retracted by the motorized card reader the threshold number of times; and
     instruct the motorized card reader to provide the card to the card storage compartment based on determining that the card has been ejected or retracted by the motorized card reader the threshold number of times.

8. The ATM of claim 7, wherein the first threshold amount of time and the second threshold amount of time are the same.

9. The ATM of claim 7, wherein the first threshold amount of time and the second threshold amount of time are different.

10. The ATM of claim 7, wherein the first threshold amount of time is smaller than the second threshold amount of time.

11. The ATM of claim 7, wherein the one or more processors are further configured to:
instruct one or more output components of the ATM to output a first indication for alerting a user to remove the card from the motorized card reader in association with instructing the motorized card reader to eject the card at the first time; and
instruct the one or more output components of the ATM to output a second indication for alerting a user to remove the card from the motorized card reader in association with instructing the motorized card reader to eject the card at the second time, wherein the second indication is different from the first indication.

12. The ATM of claim 7, wherein the one or more processors are further configured to:
receive information that identifies at least one of the first threshold amount of time or the second threshold amount of time;
store the information in the memory of the ATM; and
use the information stored in the memory of the ATM when determining that the first amount of time satisfies the first threshold or that the second amount of time satisfies the second threshold.

13. The ATM of claim 7, wherein the one or more processors are further configured to transmit an instruction, via a communication component of the ATM, to contact a mobile device associated with the card based on instructing the motorized card reader to eject the card at the first time or the second time.

14. A non-transitory computer-readable medium storing a set of instructions, the set of instructions comprising:
one or more instructions that, when executed by one or more processors of a device that includes a housing, a storage compartment for storing physical objects within the housing, and an object ejection component for retracting and ejecting one or more physical objects from the device, cause the device to:
receive information that identifies a threshold number of times that a physical object is to be ejected or retracted,
wherein the threshold number of times is two or more;
configure the device to eject or retract the physical object the threshold number of times based on the received information that identifies the threshold number of times that the physical object is to be ejected or retracted;
determine a number of times that the physical object has been ejected from the object ejection component or has been retracted by the object ejection component;
determine whether the number of times that the physical object has been ejected from the object ejection component or has been retracted by the object ejection component satisfies the threshold number of times; and
retain or eject the physical object using the object ejection component based on determining whether the number of times that the physical object has been ejected from the object ejection component or has been retracted by the object ejection component satisfies the threshold number of times,
wherein the one or more instructions cause the device to retract the physical object using the objection ejection component and to retain the physical object within the storage compartment based on a determination that the number of times that the physical object has been ejected from the object ejection component or has been retracted by the object ejection component satisfies the threshold number of times, and
wherein the one or more instructions cause the device to eject the physical object using the objection ejection component based on a determination that the number of times that the physical object has been ejected from the object ejection component or has been retracted by the object ejection component does not satisfy the threshold number of times.

15. The non-transitory computer-readable medium of claim 14, wherein the device includes at least one of an automated teller machine, a fare card reader, a point-of-sale terminal, a kiosk, or a vending machine.

16. The non-transitory computer-readable medium of claim 14, wherein the physical object includes at least one of a card, currency, a check, a passbook, a receipt, or government-issued identification.

17. The non-transitory computer-readable medium of claim 14, wherein the object ejection component includes a motorized card reader or a motorized check reader.

18. The method of claim 1, wherein the first threshold amount of time and the second threshold amount of time are different.

19. The method of claim 1, wherein the first threshold amount of time and the second threshold amount of time are the same.

20. The non-transitory computer-readable medium of claim 14, wherein the device includes a display or a speaker outputting an indication of an amount of time remaining before the physical object is to be retracted by a motorized card reader.

* * * * *